United States Patent
Parnprome

(10) Patent No.: US 8,529,343 B2
(45) Date of Patent: Sep. 10, 2013

(54) METHOD FOR MONITORING COMPUTER PROGRAMS

(75) Inventor: Nipoj Parnprome, Wildomar, CA (US)

(73) Assignee: Cyber Holdings, Inc., San Diego, CA (US)

( * ) Notice: Subject to any disclaimer, the term of this patent is extended or adjusted under 35 U.S.C. 154(b) by 0 days.

(21) Appl. No.: 13/507,759

(22) Filed: Jul. 26, 2012

(65) Prior Publication Data

US 2013/0072306 A1    Mar. 21, 2013

Related U.S. Application Data

(60) Provisional application No. 61/574,144, filed on Jul. 27, 2011.

(51) Int. Cl.
*A63F 9/24*    (2006.01)

(52) U.S. Cl.
USPC ................................ 463/29; 726/23

(58) Field of Classification Search
USPC ....................... 463/21–43; 726/23
See application file for complete search history.

(56) References Cited

U.S. PATENT DOCUMENTS

| | | | |
|---|---|---|---|
| 7,169,050 B1 | 1/2007 | Tyler | |
| 7,753,795 B2 | 7/2010 | Harris | |
| 8,307,439 B2 * | 11/2012 | Schluessler et al. | 726/23 |
| 8,360,890 B2 * | 1/2013 | Tyler | 463/42 |
| 2004/0093372 A1 * | 5/2004 | Chen et al. | 709/203 |
| 2006/0100010 A1 * | 5/2006 | Gatto et al. | 463/29 |
| 2007/0276521 A1 * | 11/2007 | Harris et al. | 700/91 |
| 2008/0305869 A1 | 12/2008 | Konforty | |

OTHER PUBLICATIONS

Evan Balance, "Punkbuster for Players", http://www.evenbalance.com/publications/aa-pl/#faq, Nov. 11, 2010.
Station Casino Sports Conection, Is Sports Connection on the Internet?, http://www.stationsportsconnection.com/Help/index.htm.

* cited by examiner

*Primary Examiner* — Masud Ahmed

(57) ABSTRACT

As disclosed in this patent disclosure, I have invented a method for substantially disabling at least one cheat program, referred to as the anti-cheat software, used in conjunction with at least one online competitive game program involving at least two players, each player using at least one computer that are in online communication with each other. My invention allows the players' remote terminal to continue to function and operate independent of the host server, while at the same time having the host server, in conjunction with the anti-cheat software, substantially disable programs not required to operate the remote terminal and not required to play the online game—the programs that are substantially disabled may or may not be "cheat programs", but essentially any program not required for the operation of the remote terminal and the online game.

3 Claims, No Drawings

METHOD FOR MONITORING COMPUTER PROGRAMS

This patent document claims priority from U.S. application Ser. No. 61/574,144 filed on Jul. 27, 2011 and assigned to Cyber Holdings, Inc. by the named inventor, Nipoj Parnprome.

BACKGROUND OF THE INVENTION

Internet or "online", video gaming is a multi-billion-dollar industry http://www.theesa.com/facts/pdfs/ESA_EF_2011.pdf. Evolving from public-arcade style video games such as "Pac-Man" where a player competes against the game, and home-based video games such as "Pong" with its relatively simple back-and-forth tennis-match style of video game-playing that allowed two players to compete against each other, the industry has evolved to highly sophisticated, interactive games that allow players around the world, at all hours of the day, to play and compete with each other in a real-time, competitive basis. This evolutionary process has been driven primarily by the Internet because the Internet allows players at literally any location with access to the Internet, and who own or have access to the software to play these games, to get "online" and join others in individual-competitive and team-competitive games. These games can attract millions of players around the world on a daily basis. For example, first-person shooter games (or "shooters"), such as the "Call of Duty" series by Activision®, have over 30-million players who have played the game online at least once a month. http://www.wired.com/gamelife/2011/05/call-of-duty-elite/

While these online games are different in terms of genre, weapons, etc., in general, the common thread is the ability of a player to compete in a fictional "cyber-world", and use some type of control device (usually hand held such as a "joystick") to take on the persona of a fictional character in the cyber-world, and via the control device, manipulate that character to engage various devices carried or used by the character (such as weapons), engage in activities required by the character (such as walking, running, discharging a weapon, etc.) and work together with those on their "team" to defeat fictional characters on another "team" who also are manipulated by other players. For example, in "military-based" games, typically players compete on behalf of one "country" against both individuals and teams who represent another "country" using weapons typical of the particular war-genre of the game. Winners are most typically individuals who score the most points.

These games all have in common the requirement of player-skill, for example, advanced hand-eye coordination, intelligence, memory, creativity, strategy, and highly developed competition skills. Luck or "chance" is rarely, if ever, a component of these games, and when luck is involved, it is typically "dumb luck" or "beginner's luck" i.e. an accidental outcome often occasioned by the mistake of another player, etc. The actual games themselves do not build a luck component into the process; rather, player-skill is what determines the outcome of the competition. Because these games require human-human interaction in a cyber-world, the outcome of the game is based on the skill of the player in manipulating his/her cyber-persona; stated differently, the game programs are not designed to artificially enhance the skill level of one player over another in any random manner, such that the element of skill is exclusive in the outcome determination (except for, as noted, "dumb luck").

A negative aspect of these online games is cheating. Increasingly, in a desire to artificially enhance the skill-set of a player or players to defeat those who are skilled and do not require an artificial advantage, there are always players who wish to gain an unfair advantage over others by using game exploits or external programs which offer an "advantage" over other players. These exploits and external programs (also referred to as "cheats") are analogous to professional athletes who use steroids to enhance their performance, thus creating an unfair advantage over players who rely solely on their own skills, talents and knowledge of the athletic contest. Cheats come in many forms such as "wall-hacks" which overlay a "heads-up" type display over the user's screen—highlighting or placing a virtual box over their opponents and also allowing the user to literally see their opponents through solid objects such as walls and buildings, which gain the user a large tactical, and unfair, advantage. Another cheat example is commonly known as an "aimbot", which in first-person shooters, automatically aims and shoots the user's weapon at opponents without requiring any skill on the part of the user. Yet another cheat overlays a virtual map for the user of the entire battlefield and shows all players (team members as Ill as opponents), allowing the user a large tactical, and yet again unfair, advantage over opponents. These are only a small example of the many hundreds of cheats and variations of cheats widely available as paid programs created by professional companies, privately created and used and those which are created by the hacking community and distributed free in public gaming forums.

All game cheats have one thing in common: they are program applications (or "cheat programs") that must be run on the user's computer in unison with the game they are playing. Stated differently, the cheat is a program that is run simultaneously with the game, whereby both are run in unison as the game is played. Players who are not at the computer that is running the cheat program do not know that the cheat program is being run, unless the cheating itself is detected or determined. In an analogous manner, a cheat is akin to a student laying the answer-key over a classroom test and seeing what the correct answer-choices are—unless the teacher or a fellow-student sees the answer key being used in conjunction with the test that every other student is taking, there is no way to know with certitude that cheating on the test took place.

Regardless of type or source, these cheats allow for an unfair advantage over skilled players who compete based on a presumed "level playing field". As with any competition, cheating not only reduces the ability of true competitors to know how they "lost" but allows the cheater to gain an improper status and advantage over legitimate players. In the "cyber world" of online gaming, detecting such cheaters is often difficult. More importantly, because the development of cheat software has become a "cottage industry", the ability to make the competitions more robust, using for example, prizes, is difficult, time consuming and expensive—unless a player can be assured that all reasonable steps have been taken to prevent the use of cheats, it is difficult to assume a level playing field. This not only reduces the ability to make the competitions more robust, but also weakens the allure of skill and the requirement of fair play.

Of equal importance is the significant damage that can be done to the reputations of game developers and sales of their products under which cheating has become rampant. Matthew Pritchard, a developer at Ensemble Studios, aptly summarizes this problem: "Cheating hit closer to home for me while I was working on the final stages of Age of Empires II: The Age of Kings. Cheating online became a widespread problem with the original Age of Empires. Tournaments had to be cancelled due to a lack of credibility, the number of online players fell, and the reputation of my company took a direct hit from frustrated users. Unable to spare the resources to fix the game properly until after Age of Kings was done, I just had to endure our users turning their anger upon us—probably the most personally painful thing I've experienced as a developer." http://www.gamasutra.com/view/feature/3149/how_to_hurt_the_hackers_the_scoop_.php.

Players using these widely available cheats have become a widespread epidemic for the online gaming world. Large and established gaming companies such as "Activision", "Electronic Arts" and even "Microsoft, just to name a few, are constantly playing a game of "cat and mouse" with cheating players, combating whichever cheats they can detect and releasing game updates and actively banning players that are caught cheating. This method of releasing updates to block the cheat or catch cheating players has been the primary approach game makers have been taking. The problem with this method is that, in order for a counter-cheating agent to be created, game makers must first detect and then devise a method to anti-cheat the hack—all of which takes time; sometimes up to weeks and months in total. In addition, the cost can be staggering; if the cheating is not stopped, players will abandon one game for another, causing significant loss in revenue, coupled with what requires significant time and effort to "block" the cheating with software changes to the original game program.

Part of the allure of cheating at these games is related to the Internet—anonymity as to name and location, a desire to win in order to be perceived as the best by fellow gamers, and little if any punishment when caught, all combine to make the process of cheating almost as powerful as the desire to use one's innate skills to win. Because players often do not use their real names (rather using "screen names"), and because their specific location is often unknown, the only way to track down a cheater is to identify the cheater's Internet Protocol address ("IP address"), which is a numerical label assigned to each device (e.g., computer) participating in a computer network that uses the Internet for communication. However, even if the user's "screen name" and IP address are identified and that player is banned from competition, that player merely needs to create a new "screen name" and secure a different computer which will have a different IP address in order to continue cheating. Detecting the IP address and blocking that address from competition is often laborious, expensive and difficult, whereas creating a new user name and securing a new computer and IP address is simple.

As the online competitive gaming process increases, the desire to enhance the stakes by providing prizes for winners is increasing. However, given the recognized ability of cheats to gain an unfair advantage in these competitions, awarding prizes is often not an option. This is particularly true where cash prizes are contemplated.

For a gaming model which involves players competing in a tournament for cash and prizes on a daily basis, the currently used methods of slow detection and anti-cheating game cheats is not feasible. This is because cheating parties could run their cheats to gain an unfair advantage over other players and win several tournament payouts before being detected. This single fact of not being able to detect, deter, and block cheating is why online gaming tournaments has not successfully accomplished by any companies, large or small, to date.

One approach to help reduce such cheating would be via a virtual private network ("VPN"). A VPN is a means of connecting to a private "local area network" at a remote location, using the Internet or any unsecure public network to transport the network data packets privately, using encryption. The VPN uses authentication to deny access to unauthorized users, and encryption to prevent unauthorized users from reading the private network packets—in this case, the encryption could be used in theory to prevent cheating software from being utilized. The VPN can be used to send any kind of network traffic securely, including voice, video or data. VPNs may also allow users to bypass regional internet restrictions such as firewalls, and web filtering, by "tunneling" the network connection to a different region. Technically, the VPN protocol encapsulates network data transfers using a secure cryptographic method between two or more networked devices which are not on the same private network, to keep the data private as it passes through the connecting nodes of a local or wide area network. While VPNs are frequently used by remote workers or companies with remote offices to share private data and network resources, in this context, online gamers would essentially connect to the host-server via a VPN such that only software available at the host server would be available to the gamers—if the cheat software is not on the host server, the VPN would prevent the gamer from using any such software, even if the cheat software is on the gamers' computer. In the context of online wagering, Station Casino Sports Connection indicates that it uses a VPN with respect to its business of facilitating placing wagers on sporting events. http://www.stationsportsconnection.com/Help/index.htm.

Other, more proactive, approaches have been proffered to deter on-line cheating. One approach, developed by Even Balance, Inc. and offered through its Punk Buster Website at http://www.evenbalance.com/, self-dubbed as the "original Anti-Cheat system for online multiplayer games." The Punk Buster software operates in a manner akin to various anti-virus software, and as noted by Evan Balance, the software provides "[r]eal-time scanning of memory by [Punk Buster] Client on players' computers searching for known hacks/cheats." As further elucidated, "PunkBuster is an automatically self-updating client/server Anti-Cheat software system. That means that players run the PunkBuster Client software while they are playing online games and also, PunkBuster Server software is running on the game server that players connect to for gameplay. The PunkBuster system is designed to hold all participants accountable by scanning the game computers looking for known cheats, game hacks, and exploits similar to the way Anti-Virus software would scan a computer looking for a virus. PunkBuster does not modify any files or settings on your computer even if it detects some type of violation, it reports what it finds and, in some cases, will remove offending players from the current game. Punk-Buster is optional. A Server Admin who decides to run Punk-Buster on his or her Game Server is simply choosing to limit players on said Game Server to players who have chosen to enable PunkBuster on their playing computers. You do not have to enable PunkBuster if you are uncomfortable with the idea of such software. However, PunkBuster is not "spyware" nor is it a trojan—it is designed for groups of honest people to use together in an effort to keep out players who are unwilling to subject their system to an objective third-party software system scanning their computer during gameplay." "Punk-Buster For Players" PunkBuster Online Countermeasure, http://www.evenbalance.com/publications/aa-pl/#faq Nov. 8, 2010.

Another approach is described in U.S. Pat. No. 7,169,050, issued on Jan. 30, 2007 to Tyler. In accordance with this described process, the concept "provides an additional level of authority, above the individual game servers, via a master database of cheaters that resides on one or more master servers and with which individual game servers communicate to transmit cheaters banned on the individual game servers and to receive a master list of cheaters aggregated from the individual game servers. In this way, once a cheater is banned on one game server, information identifying the cheater is transmitted to the master databases of the master servers for distribution to the other game servers. Advantageously, cheaters can no longer move from game server to game server in an attempt to continue cheating." "Summary of the Invention", U.S. Pat. No. 7,169,050.

Still another approach is described in U.S. Pat. No. 7,753, 795, issued on Jul. 13, 2010 to Harris and Schnieder and assigned to Sony Computer Entertainment America LLC of Foster City, Calif., USA. In accordance with the described process and software, the concept sets forth a "method for maintaining community integrity in a gaming network, comprising: monitoring one or more devices interacting with a game in the gaming network for indicia of violation of one or more rules, the one or more rules defining fair game play; identifying at least one user associated with one of the one or more monitored devices as a cheater based on at least the indicia of violation of the one or more rules defining fair game play, the indicia of violation indicating the presence of illicit game play; querying the one or more monitored devices associated with the at least one user identified as a cheater to determine the presence of new code or modified code associated with violating the one or more rules defining fair game play; and penalizing the cheater for engaging in illicit game play when a response to a query is not received or when the response includes an incorrect response, and the illicit game play is in violation of the one or more rules defining fair game play, wherein penalizing the cheater includes overwriting code on the device associated with the at least one user identified as a cheater." Claim 1, U.S. Pat. No. 7,753,795.

Further still another approach is described in United States Patent Application Publication Number 20080305869 (published on Dec. 11, 2008) by Konforty and Shimon and assigned to Cognisafe Ltd., Tel Aviv-Yafo, Israel. In accordance with the described process, "a program installed on a computer learns normal patterns of use of the assets of the computer and, based on the learned patterns, monitors the computer to detect events that may be indicative of cheating. Such cheating may include both deviant behavior by the user of the computer itself and attempts to compromise the computer carried out by users of other computers. The program implements generic methods of learning and analysis, which are not limited to a specific game or other application." "Summary of the Invention", US Publication Number 20080305869.

An ideal solution to the problem of cheat software that would be different than a VPN approach would be the ability of an organization or group to monitor these tournaments independently from the developers of the games such that regardless of game, tournaments can be played in an environment where prizes can be awarded and the ability of cheating is substantially nullified. Most ideally, the approach would avoid a requirement that software be downloaded onto the player's computer, or require a player to take affirmative steps to self-police; if a group of players includes one player who refuses to cooperate, those who use such software will continue to be "victims" to the player who opts out and thus can continue to cheat. Self-monitoring, or requiring players to download software to monitor that player's computer, presuppose that all players want to play "fair"—but if that Ire the case, no players would cheat. A more robust approach is to create an environment on which players can play, but to have that environment "referee" the process. In an analogous manner, such a solution would be akin to the National Collegiate Athletic Association (NCAA) whose core purpose is to "govern competition in a fair, safe, equitable and sportsmanlike manner." http://www.ncaa.org/wps/wcm/connect/public/ncaa/about+the+ncaa. (The NCAA has neither commented upon, nor endorsed our inventions). In this context, the NCAA does not "own" the sport or the teams. Rather, the NCAA "overlays" the process of competitive sporting events at the college level, and provides a system that allows for teams to compete based on skill under a rubric of defined rules and regulations, regardless of game, that ensures fairness and impartiality by providing referees who ensure that cheating does not occur. By reducing the ability of one team to cheat, the outcome of the event is respected, and players can focus on competition, rather than wondering if a "victory" was based on an unfair advantage.

An ability to provide an NCAA-like approach to online gaming would not only enhance the playing experience, but allow for the ability of true competitive tournaments with prizes awarded to the winners.

SUMMARY OF THE INVENTION

I disclose in my patent document methods for monitoring computer programs to detect the use of anti-cheating behavior. I disclose an approach to this problem whereby when a cheat program is present, my method involves substantially disabling at least one cheat program, when the cheat program is being used in conjunction with at least one online competitive game program involving at least two players, each player using at least one computer, where the players compete against one another individually and/or as part of a team(s) to best or defeat the other player(s) and/or team(s). Preferably, each player(s)' computer is not located within physical proximity to each other (although they can be). Preferably, the competitive game is a first-person shooter game; however my invention is not limited to first-person shooter games.

As disclosed in my patent disclosure, a method has been invented for substantially disabling at least one cheat program used in conjunction with at least one online competitive game program involving at least two players, each player using at least one computer that are in online communication with each other, comprising the steps of:

1) running, via a first remote terminal, an online competitive game program;
2) running, via a second remote terminal, the online competitive game program of Step 1;
3) said first remote terminal and said second remote terminal accessing the address of a host server, wherein said host server comprises at least one anti-cheat program;
4) upon the access of Step 3, said anti-cheat program scanning the task manager of said first remote terminal and scanning the task manager of said second remote terminal;
5) determining, via said anti-cheat software, all programs, processes and sub-processes running on said first remote terminal and said second remote terminal;
6) determining, via said anti-cheat program, if the programs, processes and sub-processes determined in Step 5 are core systems programs;
7) determining, via said anti-cheat program, if the programs, processes and sub-processes determined in Step 5 are the online competitive game program of Step 1 and Step 2;
8) identifying, via the anti-cheat program, programs that are not determined to be the system programs, processes and sub-processes of Step 6, and programs, processes and sub-processes that are not determined to be the online competitive program of Step 7.

Preferably, a ninth step is included in the process when required, i.e., substantially disabling, via the anti-cheat program, programs that are not determined to be the system programs, processes and sub-processes of Step 6, and programs, processes and sub-processes that are not determined to be the online competitive program of Step 7. Preferably, Steps 1 through Steps 8 are repeated at least once while the online competitive game is being played.

For purposes of elucidation, with respect to the programs of Steps 1 and 2, those with experience, skill and knowledge in this field will appreciate that the program is typically not the same exact program but the same version of the program used on different terminals (however, the exact same program can be used if it is downloaded onto more than one computer). As will be apparent as the disclosure continues, it is possible that none of the remote terminals are running any cheat program, or that the only programs running are those necessary for the operation of the terminal(s) and the playing of the online game. In an analogous context, a referee can watch-over a game in which neither team violates the rules—sometimes the mere presence or knowledge of the presence of the referee prevents either team from attempting to cheat or violate the rules. However, the referee is still there to monitor and "scan" the game and set the ground-rules for proper enjoyment of the competition by the teams.

Unlike for example "anti-virus" or other anti-cheat software programs that require information and knowledge about the virus before the anti-virus software can scan the computer to locate the pre-defined virus, this invention does not require any prior knowledge or identification of cheat program(s). Anti-virus or other anti-cheat software programs by and large are focused on a "cat-and-mouse" approach whereby the virus or cheat program first needs to have "infected" computers, is then identified, and then the anti-virus or anti-cheat program is created or updated to specifically block that virus or cheat—each virus or cheat requires a different anti-virus or anti-cheat program or update, such that until the virus or anti-cheat has created havoc or caused damage, users are essentially at the mercy of those who create the virus or anti-cheat and the rapidity by which the anti-virus or anti-cheat software is created or updated to thwart the new virus or cheat program.

In essence, and by way of elucidation and not limitation, my invention takes an altogether different approach as it applies to online competitive gaming and pre-supposes that unless a program, process or sub-process is essential for the operation of the remote terminal and the online competitive game, it is not required and therefore need not be operational while the online gaming process takes place. This approach does not therefore require any prior knowledge of the source or identification of anti-cheat programs.

Beneficially, my invention is focused on substantially disabling cheat programs by beneficially exploiting a commonality of such programs: cheat programs must be run on a player's computer in unison with the online competitive game program. Therefore the cheat program is by definition not necessary for the operation of the computer, and not a part of or required for the game. Consequently, rather than seek-out such cheat programs, this invention focuses on substantially disabling any program, process or sub-process not required for the operation of the computer or the non-cheat enjoyment of the game.

As further disclosed herein, this invention can include "fuzzy logic" capabilities whereby in the event that a cheat program does not allow the anti-cheat program to substantially disable the cheat program, the anti-cheat program can block the cheat program from running by blocking or isolating the cheat program's processes from running, or quarantining and/or isolating the cheat program from serendipitously or intentionally hooking into any other programs necessary for the operation of the computer or the game itself.

Once running and throughout the online completive game playing, the anti-cheat program substantially disables any new programs and applications from being run and, most preferably, also continuously scans the player(s) computer task manager and/or the anti-cheat program's own proprietary task manager like program to determine if any programs which may have not been substantially disabled from a previous scan are running, and then substantially disables such program(s). Stated differently, most preferably the anti-cheat program constantly scans the task manager of the remote terminals and/or the anti-cheat program's own proprietary task manager like program to substantially ensure that cheat programs are substantially disabled while the games are being played.

As will be intuitive to those with experience, skill and knowledge in this field, multiple players can play a variety of different games under the rubric of this invention. Stated differently, the games are based on software owned or running on a remote terminal, but the remote terminals must access the host server that contains the anti-cheat program—this approach, then, preferably does not require each player to actually load or run the anti-cheat software via an "installation disc" that is physically located within the remote terminal. By definition, an approach that involves the use of installation disc(s) that includes the anti-cheat software would allow for some players to simply not use or disable the anti-cheat program at their terminal. Rather, the games are played via a host server much in the same way two basketball teams may play on a "neutral" basketball court—each team is unique and has its own players, but neither team is playing the game at "their" basketball court. In the same manner, this invention is focused on a "referee-style" of game playing, accomplished by using the host server as the neutral "court" where the games are played. By using this approach, this invention in essence "controls" the cheating parameters by providing a neutral "location" through which the games are played—this allows for a "referee" (the anti-cheat program) to monitor each "team" and stop or identify "teams" who violate the rules, i.e., cheat. Because of this approach, and because this invention is not game specific (i.e. the anti-cheat program is not designed based upon a specific game or games), multiple players playing a myriad of different games at the same time can do so via the host server, which itself includes the anti-cheat program that can simultaneously scan each remote terminal as set forth above.

Most preferably, when a player accesses the host server that includes the anti-cheat software, the player is required to accept certain "terms and conditions" for using the host server and these would include allowing the anti-cheat software to run locally on the remote terminal(s). As those with experience, skill and knowledge in this field appreciate, a "hacker" or a cheater can mask (hide) cheat-software from being displayed and/or reported by their computer's "task manager". To overcome this issue, most preferably the anti-cheat software of this invention includes the ability to "view" all of the programs, processes and sub-processes running on the computer, irrespective of what the "task manager" may "report" thus acting as a "proprietary task manager"—this approach, i.e., the use of a proprietary task manager including in and as part of the anti-cheat program, allows the anti-cheat software to serendipitously monitor all of the programs, processes and sub-processes running on the computer, and therefore allows the anti-cheat software to substantially disable any unnecessary programs, processes and sub-processes running on the computer, even if the player is able to mask (hide) cheat-software from being displayed and/or reported by the "task manager" native to their computer.

DEFINITIONS

As used herein, the following terms and variations thereof have the meanings given below, unless a different meaning is clearly intended by the context in which such term is used.

As used herein, the phrase "substantially disabling" in conjunction with the phrase "cheat program" means eliminating, reducing and/or ameliorating so as to render useless or substantially ineffective the cheat program. The phrase "substantially disabling" need not necessarily connote 100% disablement of the cheat program, but rather substantially preventing the cheat program from being substantially operational and thus unable to provide an unfair, competitive advantage to the user of the cheat program. Thus, for example, the phrase "substantially disabling" need not mean "destroy" but rather is focused on preventing the cheat program from having substantial functional operation such that the cheat program is substantially useless for its intended purpose. According, "isolating" the cheat program would be included in the definition of "substantially disabling".

As used herein, the phrase "cheat program" is a computer program developed and designed to include the ability of the cheat program, when used in conjunction with an online competitive game, to adjust, influence or otherwise disrupt the online competitive game program by providing at least one player(s) with access to information not available to the other player(s) while the online game is being played.

As used herein, the phrase "anti-cheat program" is a computer program developed and designed to substantially disable a cheat program.

As used herein, the phrase "competitive game program" is a program designed to allow at least two players to compete against one-another online.

As used herein, a computer "program" is a series of instructions that a computer can interpret and execute. A program is also sometimes referred to as also "software" to distinguish them from "hardware" which is defined to mean the physical equipment used in data processing. The program instructions cause the computer to perform arithmetic and logical operations or comparisons (and then take some additional action based on the comparison) or to input or output data in a desired sequence. A specific type of program is a "systems program" which is a program that controls the operation of the computer. Exemplary is the operating system, sometimes referred to as the "control program", "executive", or "supervisor" which schedules the execution of other programs, allocates system resources, and controls input and output operations. Processing programs are those whose execution is controlled by the operating system.

As used herein a "process" is an instance of a computer program that is being executed and contains the program code and its current activity. Depending on the operating system of the computer, a process may be made up of multiple threads of execution that execute instructions concurrently. In this context, a program is a passive collection of instructions, while a process is the actual execution of those instructions. Accordingly, several processes may be associated with the same program; for example, opening up several instances of the same program generally is understood to mean that more than one process is being run.

As used herein a "sub-process" is associated with the term "multitasking" which allows multiple streams of instructions (threads) to execute concurrently within the same program, each stream processing a different transaction or message. In this context, each stream is a "sub-process," and the operating system typically cooperates with the application to handle the threads.

As used herein an "application" or "application program" is distinguished from "systems program" and is a software program that runs on a computer, including but not limited to, Internet browsers, electronic-mail programs, word processors, and online games, as those with experience, skill and knowledge in this field appreciate, the word "application" is used because each program has a specific application for the user.

As used herein the term "compete" means to strive against another or others to attain a goal, such as an advantage or a victory. Preferably, the term "strive" as used in the definition involves substantially more skill than luck such that the advantage or victory is secured more by skill than luck.

As used herein the phrase "online" or the term "web" each refers to the "Internet", a global system of interconnected computer networks that use the standard Internet Protocol Suite (TCP/IP) to serve billions of users worldwide. Stated differently, the "Internet" consists of millions of private, public, academic, business, and government computer networks, of local to global scope, that are linked by a broad array of electronic, wireless and optical networking technologies. Therefore, "online communication" would refer to the process of at least two computers being able to interact with one another via the Internet.

As used herein a "computer network" is a collection of computers and devices interconnected by communications channels that facilitate communications and allows sharing of resources and information among interconnected devices. Stated differently, a computer network is a collection of two or more computers linked together for the purposes of sharing information, resources, or, in the case of the present invention, competitive games.

As used herein the term "player" generally refers to an individual or a group of individuals; however the phrase need not be limited to human players whereby a player can be a computer program designed to compete with another player.

As used herein, a "computer" is a programmable machine designed to sequentially and automatically carry out a sequence of arithmetic or logical operations. The particular sequence of operations can be changed readily, allowing the computer to solve more than one kind of problem. As generally understood by those with education, experience and skill within the field of computers, a computer consists of some form of memory for data storage, at least one element that carries out arithmetic and logic operations, and a sequencing and control element that can change the order of operations based on the information that is stored. Peripheral devices allow information to be entered from an external source, and allow the results of operations to be sent out. A type of computer is the "personal computer" or "PC" generally device situated on a desk or similar location. However, the term "computer" is not limited to a PC and can include various "hand-held" devices such as the "iPhone" marketed and sold by Apple, Inc. which can access the Internet and run programs, as Ill as video game-playing consuls such as Microsoft's "Xbox 360", Sony's "PlayStation 3" and Nintendo's "Wii".

As used herein, a computer "task manager" is a feature that provides details about programs, processes and sub-processes running on the computer. A computer task manager also generally displays the most commonly used performance measures for programs, processes and sub-processes. The computer task manager generally provides details on current programs, processes or sub-processes that are running. As used in this context "run" or "running" mean to execute a computer program. Computer task managers are also used to monitor specific software or operating tasks in progress on the computer. Although the phrase "task manager" is generally associated with Microsoft Windows® operating systems, the phrase, as used herein, is not limited to such operating systems or the default or native "Task Manager" program which accompanies them. Those with experience, skill and knowledge in the computer arts are credited with understanding what a computer task manager is and does. Related to a "task manger" in terms of functionality, my anti-cheat software includes a "serendipitous task manager" that monitors all programs, processes and sub-processes running on the computer independently of the computer's native (standard and/or default) task manager. Therefore, as used herein, the phrase "scanning the task manager" with reference to the anti-cheat software of my invention includes scanning the native task manager of the player(s) remote terminal, and scanning and reviewing all of the programs, processes and sub-processes running on the remote terminal as identified by the serendipitous task manager. The phrase "task manager" includes within its definitions any computer process monitoring software which monitors all of the computer's processes and sub processes.

As used herein, the term "scan" and "scanning" in reference to the term "program" or the phrase "task manger" means to search for a specific program, program type, process or sub-process, data and/or data type.

As used herein, the term "launch" in reference to the term "program", including but not limited to "game program", means to cause the program to run.

As used herein, the term "run" as used herein means to execute or start a program; "running" in this context means a program that has been executed and started and is operational. In the context of my invention, the term run can be both active and passive. For example, an individual can load a program onto a computer and actively run that program. However, a program can be run without active participation by an individual; for example, in the context of my invention, when two players compete in an online competitive gaming program through a server housing the anti-cheat program, the anti-cheat program is most preferably automatically downloaded as a stream of data at the player's computer and runs automatically.

As used herein the term "server" means a software program, or the computer on which that program runs, that provides a specific kind of service to client software running on the same computer or other computers on a network. A single computer can have multiple server software applications running on it. Also, it is possible for a computer to be both a client and a server simultaneously; this is accomplished by connecting to itself in the same way that a separate computer would. As used herein, a "client-server" is an architecture (also referred to as a system design) that divides processing between clients and servers that can run on the same machine or on different machines on the same network. As those with experience, skill and knowledge in this field will appreciate, a client server is a major element of modern operating system and network design. In general and in the context of my invention, a player provides the user interface, such as a graphical user interface, and performs some or all of the processing on requests it makes from the server, which maintains the data and processes the requests—an example is a "web server", which stores files related to web sites and serves, that is, sends, them across the Internet to a player(s) when requested by a player(s). Specific sub-types of servers include: a "file server" generally understood to be a program (s), or hardware plus a program(s), that is dedicated to storing files and making them accessible for reading and writing to player(s) across a network; "network server" manages network traffic; a "database server" allows clients to interact with a database; an "application server" runs programs on the computer.

As used herein, the term "client" is a computer system that is accessed by a player(s) engaging at a location, with the location preferably located remote from the location of the server. As those with experience, skill and knowledge in this field will appreciate, a host is generally understood in the context of at a computer that has full two-way access to other computers connected via the interne or some other means of communication that allows, for example, the sharing of information or data among players who access the host computer from each player(s)' computer. In general, the computer system that contains the data is called the host, while the computer system at which the player is located is referred to the "remote terminal".

As used herein, the term "network" means a collection of at least two computers interconnected by communications channels that facilitate communications and allows sharing of resources and information among interconnected devices. Stated differently, a network is a collection of two or more computers linked together for the purposes of sharing information, resources, etc.

As used herein, a "URL" or "address" means a type of uniform resource identifier that consists of a uniform address that both identifies an abstract or physical resource on the Internet and indicates how to locate it. For example, the URL for the United States Patent and Trademark Office is http://www.uspto.gov/.

As used herein, an "executable file" is an "instruction" that causes a computer to perform indicated tasks according to encoded instructions, as opposed to a data file that must be parsed by a program to be meaningful. These instructions are generally machine code instructions for a physical central processing unit ("CPU") which is the portion of a computer system that carries out the instructions of a computer program, and is the primary element carrying out the functions of the computer or other processing device. However, as those with experience, skill and knowledge in the field appreciate, in a more general sense, a file containing instructions (such as byte code) for a software interpreter may also be considered executable, and even a scripting language source file may therefore be considered executable in this sense. Some operating systems designate executable files by filename extension (such as, for example ".exe") or noted alongside the file in its metadata (such as by marking an "execute" permission in "Unix-like" operating systems). Most also check that the file has a valid executable file format to safeguard against random bit sequences inadvertently being run as instructions. Modern operating systems retain control over the computer's resources, requiring that individual programs make system calls to access privileged resources. Because each operating system family features its own system call architecture, executable files are generally tied to specific operating systems. As those with as those with experience, skill and knowledge in the field appreciate, there are many tools available that make executable files made for one operating system work on another one by implementing a similar or compatible application binary interface—for example "Wine", which implements a Win32-compatible library for x86 processors. For purposes of elucidation, other "endings" that may follow a "dot" exist are not instructions, but often are used as a source identifier in a URL address. For example, for the Internet address http://warzonesecure.com, the ".com" suffix is generally understood to mean that the entity preceding the "dot com" is a commercial enterprise (although this is not always the case anymore). This distinction has blurred over the recent years in that when the Internet initially became more widespread in its utility, 3-letter suffixes Ire used to denote groups of United States based web-sites, using ".com" for commercial sites, ".edu" for educational institutions, ".gov" for government institutions, ".org" for non-profit organizations, and so forth. Other countries Ire supposed to use a dual-suffix system, where the first suffix denotes the group and the second the country, for example, ".co.uk" for a commercial site located in the United Kingdom.

As used herein, a "dynamic-link library", or "DLL", is Microsoft's implementation of the shared library concept in the Microsoft Windows and OS/2 operating systems. These libraries usually have the file extension ".DLL", ".OCX" (for libraries containing "ActiveX" controls), or ".DRV" (for legacy system drivers). The file formats for DLLs are the same as for Windows .EXE files—that is, Portable Executable (PE) for 32-bit and 64-bit Windows, and New Executable (NE) for 16-bit Windows. As with EXEs, DLLs can contain code, data, and resources, in any combination. As those with as those with experience, skill and knowledge in the field appreciate, any data file with the same file format can be referred to as a "resource DLL". Examples of such DLLs include icon libraries, sometimes having the extension ".ICL", and font files, having the extensions ".FON" and ".FOT". DLL's are a generic core Windows OS process name for services that run from DLL (dynamic-link libraries). As those with experience, skill and knowledge in this field appreciate, Microsoft® has begun moving all the functionality from internal Windows services in .DLL files instead of .EXE files. As those with experience, skill and knowledge in this field appreciate, from a programming perspective, this makes more sense for reusability; however, because .DLL files cannot be directly launched from Windows and have to be loaded up from running executable, SVCHOST.EXE ("service host" or "SvcHost") was developed to execute these .DLL's. In this context, SVCHOST.EXE is generally understood to mean a system process which hosts multiple Windows services. Its executable image, "%SystemRoot%\System32\Svchost.exe" or "%SystemRoot%\SysWOW64\Svchost.exe" (for 32-bit services running on 64-bit systems) runs in multiple instances, each hosting one or more services. As those with skill, knowledge and experience in this field appreciate, SVCHOST.EXE is important in the implementation of so-called "shared service processes", where a number of services can share a process in order to reduce resource consumption.

As used herein, a "process explorer" is a computer program for "Microsoft Windows". Process Explorer is a system monitoring and examination utility. As those with experience, skill and knowledge in the field appreciate, "process explorer" provides the functionality of Windows® "task manager" along with a set of features for collecting information about processes running on the user's system. It can be used as the first step in debugging software or system problems. As those with experience, skill and knowledge in the field appreciate, a "process explorer" can be used to track down problems; for example, it provides a means to list or search for named resources that are held by a process or all processes. This can be used to track down what is holding a file open and preventing its use by another program. A "process explorer" can show the command lines used to start a program, allowing otherwise identical processes to be distinguished, or akin to a "task manager", it can show a process that is maxing out the CPU, but unlike a "task manager", it can show which thread using the CPU—information that is most typically not even available under a debugger.

As used herein a "stop program", "halt instruction", "stop instruction" or stop program" are instructions built into a computer program that will automatically stop a program or application or process or sub-process, or the computer itself, under certain conditions, or upon reaching the end of processing or completing the solution of a program.

DETAILED DESCRIPTION

Although my invention is not limited to any particular operating system or software, for purposes of elucidation and not limitation, and for ease of presentation, my disclosure is set forth with respect to operating systems and programs provided and offered for sale by Microsoft® and its Windows® products. Although the following list is not intended to be exclusive, in general, a typical personal computer using Windows® processes will have the following core processes running when the computer is operational: SVCHOST.exe; Csrss.exe (Client/Server Run-Time Subsystem—as those with experience, skill and knowledge in the field appreciate, this is often described as an essential subsystem that must be running at all times); Taskhost.exe; Lsass.exe (Local Security Authentication Server—as those with experience, skill and knowledge in the field appreciate, this verifies the validity of user logons to the computer); System; System Idle Process; Services.exe (as those with skill, knowledge and experience in the field appreciate, this is responsible for starting and stopping Windows® services); Tasking.exe (as those with experience, skill and knowledge in the field appreciate, this is understood to be a "task scheduler engine"); Winlogon.exe (as those with experience, skill and knowledge in the field appreciate, this handles user logon requests and intercepts the "Ctrl+Alt+Delete" key sequence); Smss.exe—(i.e., a "session manager"); Wininiti.exe; and Wmiprvse.exe. For purposes of grouping, the foregoing are collectively referred to herein as "Windows® Processes" and are meant to include all processes necessary for the computer operating system to run the computer and allow other programs to run on that computer.

The number of online games is at present relatively "small" in number relative to the universe of all available computer programs. This is noted in that the ability to ascertain and identify online game instructions (many of which include the program extensions ".exe" or ".DLL"; as those with experience, skill and knowledge in this field appreciate, there are different program extension associated with programs, processes and sub-processes that have the same functional objectives of the .exe and .DLL extensions) is not considered to be an arduous task for those with experience, skill and knowledge in this field. The games themselves will also have an ".exe" and/or ".DLL" or similar ending so as to be recognized by the CPU of the user's computer as an instruction for the online game program. For purposes of grouping, all instructions necessary for the online game to be operational on a computer are collectively referred to herein as "Game Applications" and are meant to include all processes necessary for the computer operating system to run the online game.

In a simplified manner of explanation, my invention begins with the proposition that serious online gamers do not cheat and do not seek "victory" through cheating, and above all, do not appreciate those who do cheat from being perceived in the cyber-world as skilled participants based on their (unknown)

cheating. From that perspective, my invention also presupposes that serious online gamers do not use any cheat software, and while playing the game, do not need to operate any programs other than the online game, and those programs necessary to operate the computer and allow the game to be implemented. Therefore, continuing this simplified explanation, my invention assumes that any program not required to run the computer or run the online game is unnecessary and is therefore something not required to be running while the online game is running and therefore can and should be substantially disabled. However, unlike a VPN approach that secures the data passed between the server and the computer via the Internet where the computer is secure from third-party attempts to intercept the data, my invention takes a less "draconian" approach and instead monitors the programs running on the player's computer, and substantially disables any programs not necessary for the computer to properly operate or for the on-lien game to properly operate.

For purposes of providing a disclosure for my invention, the disclose set forth herein shall be focused on two remote computers with two players competing against one another using the same online game. However, as those with experience, education and skill in the field will appreciate, my invention is not limited to just two remote terminals or two players or a single online game.

In general, each player has the online game on their remote terminal, either as downloaded software or by running the software on the computer while the game is being played. Each user in general runs the online game at his/her remote terminal, and each access a host server via a unique Internet address for that server, with the host server including as part thereof anti-cheat software as disclosed herein. At this point, the host server functions as a cyber "playing field" on which the players engage in the online game. Upon access by the remote terminals to the host server, the anti-cheat program proceeds to scan each computer's task manager for all resident programs, processes and sub-processes.

Most preferably, the anti-cheat program scans the "task manager" of each remote computer for all running applications, generally found under the "Applications" tab of the computer. Any applications present which are not the anti-cheat software application or Game Processes are terminated via a "stop process" command that is part of the anti-cheat software. Most preferably, the anti-cheat program scans all processes and sub-processes generally found under the "task manager's" "Processes" tab. Any processes which are not the core Windows Processes are terminated and further blocked from restarting as long as the computer(s) is in communication with the host server and the Game Processes are in operation.

My invention explores the processes one level deeper than Windows® Task Manager by listing all sub-services of all Windows® Processes, whereby as disclosed above, the anti-cheat program also terminates or isolates any sub-services which are not related to maintaining the operating systems state while the online game is being played, the Game Applications and the anti-cheat software application. Termination is accomplished via a "stop process" command or an analogous command.

The anti-cheat program of my invention also includes the functional ability to isolate an application, process and/or program as an alternative to substantially disabling the application, process or program from running. As those with experience, skill and knowledge in this field appreciate, such isolation is also known as "sandboxing". This is accomplished by creating and then moving any application, processes and/or program to an isolated virtual environment within the compute's hard drive and/or memory. While contained within this isolated environment, the application, process and/or program cannot interact with any application(s), process(es) and/or program(s) which are not contained within the same virtual environment. Similar existing isolation applications are "iCore", "BufferZone Pro" and "GeSwall" which, as those with experience, skill and knowledge in this field appreciate, are commonly used to isolate programs which the user suspects may be viruses or have adverse effects on their system.

As the present invention's anti-cheat program explores and scans all .DLL services running under all instances of SVCHOST.EXE, the anti-cheat program determines whether these .DLL's are required to run the base operating system and the actual online game itself, or a non-essential process. Should the anti-cheat software determine something to be non-essential, it will proceed with stopping/terminating the service or isolating it.

The present invention's program most preferably repeats the same process at least once while the online game is being played by the players to ensure that no application or process has been launched after the initial screen-scan. In addition, and as a full and complete component of my invention, my disclosure includes a non-transitory computer-readable medium in which program instructions are stored where in the instructions comprise methods for conducting the methods as disclosed herein.

Although my invention has been disclosed in considerable detail, those with experience, skill and knowledge in this field will appreciate ways to modify the invention without detracting from the scope of the invention I have disclosed. Such modifications are within the scope and purview of the claims that follow. All references cited herein are incorporated herein fully by reference.

What is claimed is:
1. A method for monitoring at least one online competitive game program involving at least two players, each player using at least one computer that are in online communication with each other, comprising the steps of:
  (a) running, via a first remote terminal, an online competitive game program;
  (b) running, via a second remote terminal, the online competitive game program of Step (a);
  (c) said first remote terminal and said second remote terminal accessing the address of a host server, wherein said host server comprises at least one anti-cheat program;
  (d) upon the access of Step (c), said anti-cheat program scanning the task manager of said first remote terminal and scanning the task manager of said second remote terminal;
  (e) determining, via said anti-cheat software, all programs, processes and sub-processes running on said first remote terminal and said second remote terminal;
  (f) determining, via said anti-cheat program, if the programs, processes and sub-processes determined in Step (e) are core systems programs;
  (g) determining, via said anti-cheat program, if the programs, processes and sub-processes determined in Step (e) are the online competitive game program of Step (a) and Step (b);
  (h) identifying, via the anti-cheat program, programs that are not determined to be the system programs, processes and sub-processes of Step (f), and programs, processes and sub-processes that are not determined to be the online competitive program of Step (g);

(i) substantially disabling, via the anti-cheat program, programs that are not determined to be the system programs, processes and sub-processes of Step (f), and programs, processes and sub-processes that are not determined to be the online competitive program of Step (g).

2. The method of claim 1 wherein Steps (a) though (h) inclusive, are repeated at least once, prior to initiation of Step (1).

3. A computer software product for monitoring at least one online competitive game program involving at least two players, each player using at least one computer that are in online communication with each other, each player using a competitive game program wherein each said programs provide substantially the same game, the product comprising a non-transitory computer-readable medium in which program instructions are stored, the instructions comprising a monitoring program for installation in each of said player's remote terminals that are in online communication with each other, wherein said instructions comprise:

(a) scanning the task manager of said first remote terminal and scanning the task manager of said second remote terminal;

(b) determining all programs, processes and sub-processes running on said first remote terminal and said second remote terminal;

(c) determining if the programs, processes and sub-processes determined in Step (b) are core systems programs;

(d) determining if the programs, processes and sub-processes determined in Step (b) are competitive game programs;

(e) identifying programs that are not determined to be the system programs, processes and sub-processes of Step (c), and programs, processes and sub-processes that are not determined to be the online competitive program of Step (d); and (f) substantially disabling programs that are not determined to be the system programs, processes and sub-processes of Step (c), and programs, processes and sub-processes that are not determined to be the online competitive program of Step (d).

* * * * *